United States Patent [19]

Haze et al.

[11] Patent Number: 5,376,173

[45] Date of Patent: Dec. 27, 1994

[54] SEGREGATION REDUCING AGENT FOR HYDRAULIC COMPOSITION AND HYDRAULIC COMPOSITION

[75] Inventors: Akira Haze, Kawanishi; Yoshihisa Yamamoto; Kazuki Miyanagi, both of Kakogawa; Shunsaku Uchida, Himeji, all of Japan

[73] Assignee: Takeda Chemical Industries, Ltd., Osaka, Japan

[21] Appl. No.: 120,344

[22] Filed: Sep. 14, 1993

[30] Foreign Application Priority Data

Sep. 17, 1992 [JP] Japan .................. 4-247692

[51] Int. Cl.$^5$ ............................... C04B 24/10
[52] U.S. Cl. .................... 106/804; 106/205; 106/209; 106/802; 106/805; 106/823; 428/403; 428/407
[58] Field of Search ............... 106/205, 203, 802, 823, 106/209, 804, 805; 428/403, 407

[56] References Cited

U.S. PATENT DOCUMENTS

| | | | |
|---|---|---|---|
| 4,047,967 | 9/1977 | Majidzadeh et al. | 524/4 |
| 4,090,016 | 5/1978 | Tsuji et al. | 106/162 |
| 4,462,836 | 7/1984 | Baker et al. | 106/720 |
| 4,683,150 | 7/1987 | Hirao et al. | 106/162 |
| 5,154,771 | 10/1992 | Wada et al. | 106/730 |
| 5,174,821 | 12/1992 | Matsuoka et al. | 106/730 |
| 5,221,790 | 6/1993 | Besnard et al. | 106/162 |

FOREIGN PATENT DOCUMENTS

| | | | |
|---|---|---|---|
| 0409609 | 1/1991 | European Pat. Off. | |
| 2633940 | 1/1990 | France | |
| 2813547 | 10/1978 | Germany | 106/162 |
| 2813921 | 10/1978 | Germany | 106/162 |
| 3237049 | 10/1991 | Japan | |
| 3285857 | 12/1991 | Japan | |
| 4367550 | 12/1992 | Japan | |
| 88/10284 | 12/1988 | WIPO | 106/162 |

*Primary Examiner*—Anthony Green
*Attorney, Agent, or Firm*—Wegner, Cantor, Mueller & Player

[57] ABSTRACT

A segregation reducing agent for a hydraulic composition which is obtained by adding a water-soluble thickener to a culture of a microorganism capable of producing a β-1,3-glucan selected from the group consisting of curdlan, palamylon and pachyman, in a sufficient amount to give a viscosity to the culture of from about 200 to 2000 cp, followed by spray drying so as to form a powder having a core of the β-1,3-glucan and a coating of the water-soluble thickener.

11 Claims, 1 Drawing Sheet

SEGREGATION REDUCING AGENT FOR HYDRAULIC COMPOSITION AND HYDRAULIC COMPOSITION

FIELD OF THE INVENTION

The present invention relates to a segregation reducing agent for a hydraulic composition such as concrete. The segregation reducing agent of the present invention makes it possible to prepare a hydraulic composition such as concrete having high fluidity, high filling ability and high resistance to segregation without vibration compacting operations. Further, the present invention also relates to a hydraulic composition comprising the segregation reducing agent.

BACKGROUND OF THE INVENTION

Technology which gives concrete high fluidity and high filling ability to make it possible to prepare concrete without compacting operations has been developed as the so-called "high performance concrete" of Professor Okamura of the Department of Engineering of Tokyo University (see, Doboku Seko, October 1989 and JP-A 3-237049). Further, concrete containing a non-segregation admixture used for in-water segregation concrete has also been developed.

In the case of high performance concrete, however, it necessary to carefully select the materials in order to produce concrete which has a very high powder content. Moreover, small amounts of viscosity enhancers must be used in order to prevent segregation of the concrete while it is in the fluid state. Therefore very careful quality control must be exercised over the materials being used, and strict production control is also required. It is quite difficult to perform on-site formulation and utilization of this type of concrete.

Further, concrete containing an in-water non-segregation admixture has poor fluidity, so when it is poured into highly reinforced forms, it is very difficult to achieve proper filling without compaction. Also, because it has a large unit water content, this concrete has a high degree of shrinkage during drying, and which, due to the large air bubbles within, causes lowered resistance to freezing and thawing and thus, lowered durability.

Thus, the above prior art is problematic. That is, the preparation of the concrete is readily affected by conditions for the preparation, and the allowable variation of the water content in the concrete and the allowable temperature variation in summer and winter are small.

OBJECTS OF THE INVENTION

The main object of the present invention is to provide a segregation reducing agent for a hydraulic composition, said segregation reducing agent making it possible to prepare concrete with high resistance to segregation, high fluidity and excellent filling ability at a low cost.

Another object of the present invention is to provide a hydraulic composition comprising the segregation reducing agent, said hydraulic composition having high resistance to segregation, high fluidity and excellent filling ability.

These objects as well as other objects and advantages of the present invention will become apparent to those skilled in the art from the following description with reference to the accompanying drawings.

SUMMARY OF THE INVENTION

Figure 1:
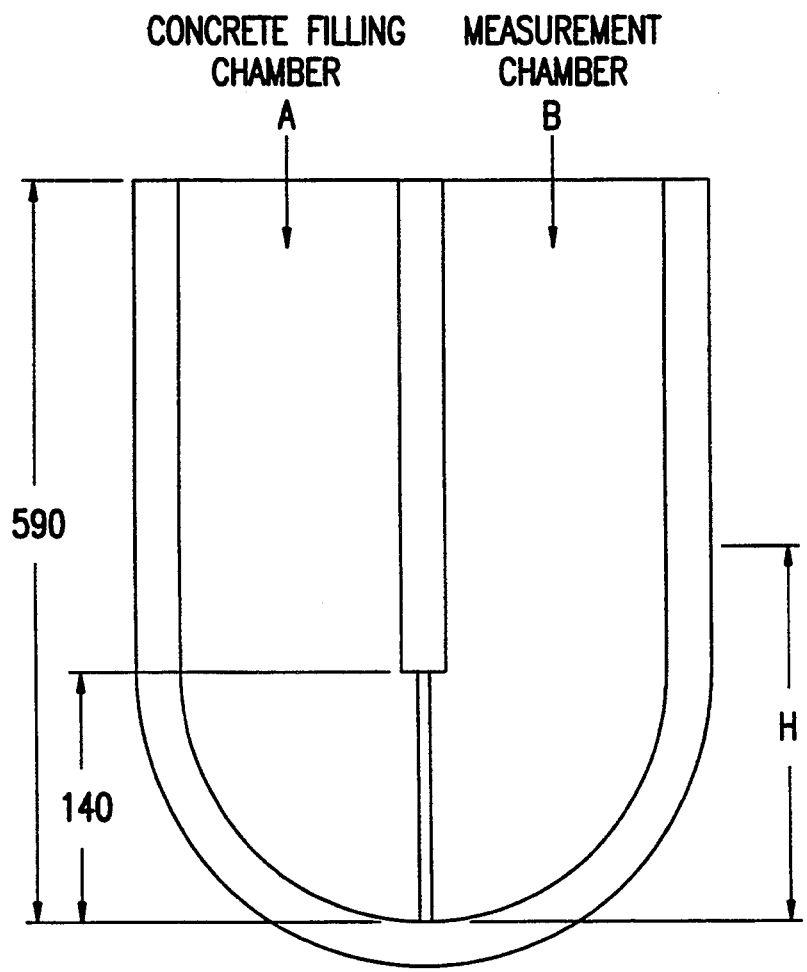
FIG. 1 is a front elevational view of a U-shaped container used to determine the filling height; the length is indicated in terms of mm.
Figure 2:
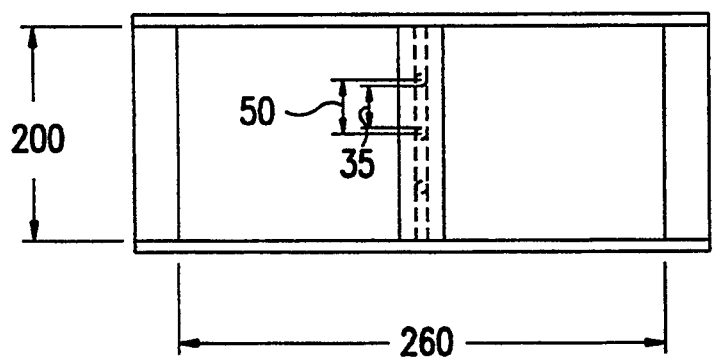
FIG. 2 is a top plan view thereof.

The present inventors have intensively studied to develop a segregation reducing agent for hydraulic compositions which have high filling ability and maintain high fluidity and high resistance to segregation against the water content variation and temperature variation in the use for concrete and which can be produced at a low cost in a short production process, as well as a hydraulic composition.

As a result, it has been found that there can be obtained powders having $\beta$-1,3-glucan as the core and having coating of a water-soluble thickener on the surface of the core by adding the water-soluble thickener to a culture of a microorganism capable of producing $\beta$-1,3-glucan, followed by spray drying. Furthermore, it has also been found that the powders are useful as a segregation reducing agent for a hydraulic composition.

That is, according to the present invention, there is provided a segregation reducing agent for a hydraulic composition which is obtained by adding a water-soluble thickener to a culture of a microorganism capable of producing $\beta$-1,3-glucan, followed by spray drying. There is also provided a hydraulic composition comprising the segregation reducing agent.

DETAILED DESCRIPTION OF THE INVENTION

In the segregation reducing agent for a hydraulic composition of the present invention, the thickener on the surface of the powder particles dissolves in, for example, concrete to give the concrete high resistance to segregation. Further, the particles of the core swell in the concrete to form calcium gel particles. Thus, the segregation reducing agent gives the concrete high fluidity and high filling ability based on the bearing effect of the calcium gel particles.

The $\beta$-1,3-glucan is a polysaccharide composed of glucoses which are primarily bonded through $\beta$-1,3-glycosidic linkages. Specific examples thereof are curdlan, paramylon, pachyman and the like. In this invention, curdlan is especially preferred.

Curdlan is a polysaccharide primarily composed of $\beta$-1,3-glucose joined to each other through $\beta$-1,3-glycosidic linkages, and is generally thermo-gelable, namely gelable on heating in the presence of water, as described in vol. 20, No. 10, pp. 49–57 (1978) in New Food Industry.

Any microorganism can be used in the present invention so long as it is capable of producing $\beta$-1,3-glucan. When the $\beta$-1,3-glucan is curdlan, examples of the microorganism include microorganisms belonging to the genus Alcaligenes, microorganisms belonging to the genus Agrobacterium and the like. As examples of the microorganisms belonging to the genus Alcaligenes, there are *Alcaligenes faecalis* var. myxogenes 10C3K [Agricultural Biological Chemistry, Vol. 30, p. 196 (1966)], a mutant NTK-u (IFO-13140) of *Alcaligenes faecalis* var. myxogenes 10C3K (JP-B 48-32673, U.S. Pat. No. 3,754,925) and the like. As examples of the microorganisms belonging to the genus Agrobacterium, there are *Agrobacterium radiobacter* (IFO 13127) and its mutant U-19 (IFO-13126) (JP-B 48-44866) and the like.

When the β-1,3-glucan is paramylon, examples of the microorganisms to be used in the invention include microorganisms belonging to the genus Euglena. Specific examples thereof include *Euglena gracilis* Klebs NIES-47, *Euglena gracilis* Klebs NIES-48, *Euglena gracilis* var. bacillaris pringsheim NIES-49 and the like. These strains are known strains maintained at the Global Environmental Forum (16-2, Onogawa, Tsukuba-shi, Ibaragi, Japan). Among these polysaccharides, those having thermo-gelable properties can be used in the present invention. For example, thermo-gelable properties can be provided by dissolving the culture of the above microorganism in an alkali, and then adjusting the residue to pH 10 or lower to obtain deposits which can be used in the present invention.

The term "culture" includes a culture broth containing the microbial cells. It may be a crude culture broth.

The culture of the microorganism capable of producing β-1,3-glucan can be obtained by cultivating the microorganism by conventional methods.

Examples of the water-soluble thickener include water-soluble celluloses such as methyl cellulose, carboxymethyl cellulose; xanthan gums; water-soluble synthetic polymers such as polyethylene glycol and the like. Xanthan gums are preferred because their viscosity changes slightly, if at all, in the temperature range of about 10° to about 70° C. or in the pH range of about 3 to about 13.

The water-soluble thickener is added in a sufficient amount for the desired viscosity of the culture. For example, when the β-1,3-glucan content in the β-1,3-glucan culture is about 40 mg/ml, namely about 4.0 w/v % (the viscosity of the culture is generally about 100 to about 200 cp), the water-soluble thickener is added so that the viscosity of the culture becomes about 200 cp to about 2000 cp, preferably about 200 cp to about 1000 cp. Although the water-soluble content varies depending upon the kind of water-soluble thickener to be used, for example, the water-soluble thickener is contained in an amount of about 2 to about 45% by weight based on β-1,3-glucan when the viscosity of the culture is about 200 cp to about 1000 cp.

In the spray drying, according to a per se known method, for example, the pressure atomizing method, binary fluid nozzle atomizing method or single fluid pressure nozzle method, hot air at about 150° to about 250° C. is used.

The average particle diameter (weight average diameter) of the particles of the segregation reducing agent obtained is preferably not more than about 100 μm, more preferably about 50 to about 80 μm. When the average particle diameter is not more than about 100 μm, the β-1,3-glucan particles at the core swell in water and the bearing effect is exhibited.

The amount of the segregation reducing agent to be used is preferably about 0.5 kg to about 5 kg, more preferably about 1 kg to about 3 kg per m³ of concrete when added to a hydraulic composition. When the amount to be added is less than about 0.5 kg/m³, the resistance to segregation decreases and the aggregate tends to segregate. On the other hand, when the amount exceeds about 5 kg/m³, the viscosity increases and the fluidity becomes poor.

The hydraulic composition comprises powders of hydraulic substances normally used in a hydraulic composition, water and the above segregation reducing agent.

In accordance with the application, a fine aggregate can be further used to make a mortar composition, and both fine and coarse aggregates can be included to adjust the composition for concrete applications. Cement is preferred in the powders of hydraulic substances.

Any of the materials used in the prior art as a fine or coarse aggregate may be used in the hydraulic composition of the invention.

Concrete is preferred in the hydraulic composition.

The hydraulic composition of the invention can be obtained by conventional methods, for example, by adding water and the above segregation reducing agent to powders of hydraulic substances, followed by mixing. Cement is preferred in the powders of hydraulic substances.

Examples of the powders of hydraulic substances include cement, lime, gypsum, calcium silicate, calcium carbonate and the like.

Examples of the cement include various cement represented by portland cement. Examples of the portland cement include ordinary portland cement, high-early-strength portland cement, moderate heat portland cement, sulfate resisting portland cement and the like. The modifying materials normally used such as quartzite, diatomaceous earth, blast-furnace slag, fly ash, silica humite or the like may be added to the cement.

When binding materials (hereinafter, which means mixtures of cement and modifying materials thereof), for example, comprised of portland cement, fly ash and blast-furnace slag are used in an amount of 250 to 750 kg/m³ per unit volume of the concrete, the segregation reducing agent is used in an amount of about 0.1 to about 1% by weight, preferably about 0.2 to about 0.7% by weight based on the binding materials in the hydraulic composition of the invention. Water is used in an amount of about 160 to about 180 kg/m³ per unit volume of the concrete. Further, high performance water reducing agent may be added in an amount of about 0.2 to about 6% by weight, preferably about 0.5 to about 3% by weight based on the binding materials. As examples of the high performance water reducing agents, there are those conventionally used for concrete. Examples thereof include water reducing agents of naphthalene type agents such as highly condensed formalin naphthalene sulfonate; melamine type agents such as sulfonated melamine formalin condensate; and the carboxylic acid type and lignin type agents. In addition, there may be used conventional admixtures such as AE agent (e.g., lignin sulfonate, resinates, alkylarylsulfonic acid amine salts, etc.), water reducing agents (e.g., lignin sulfonates, oxyorganic acid salts, alkylarylsulfonates, polyoxyethylene alkylaryl ether, polyol complexes, higher polyhydric alcohol sulfonate, etc.). AE water reducing agent may be used in combination of two of these agents.

As described hereinabove, the present invention provides the following effects:

It makes it possible to prepare concrete with high fluidity, high filling ability and excellent resistance to segregation at a low cost.

Further, it makes it possible to prepare concrete with excellent workability. The preparation of the concrete is affected little, if at all, by the seasonal temperature or by the unit water content in the concrete.

Compaction of the concrete is, therefore, not necessary during the work, and the concrete can simply be poured. The number of workers needed for the compaction can be reduced, and labor is saved.

In comparison with other concrete with high resistance to segregation, it is not necessary to carefully select the materials to be used, so any materials that fulfill the specification may be used. It dose not require strict quality control, so it may be used in a wide range of on-site operation.

Furthermore, since the aggregates of this invention are difficult to segregate, it makes it possible to construct concrete structures with high water-tightness and durability as well as uniform and stable quality.

The following examples further illustrate the present invention in detail but are not to be construed to limit the scope thereof.

EXAMPLE 1

The segregation reducing agent was prepared as follows.

The culture (culture of curdlan, containing about 4% w/v of β-1,3-glucan) of *Alcaligenes faecalis* var. myxogenes NTK-u strain was obtained by a conventional method. A 2% w/v aqueous solution of methyl cellulose (Shin-etsu Kagaku K.K., Methlose SM.4000) was prepared as a water-soluble thickener solution. The above culture and solution were mixed with stirring so that the ratio of the methyl cellulose in the methyl cellulose solution based on the β-1,3-glucan in the culture became 98:2 (2 w/w %), 95:5 (about 5 w/w %) and 90:10 (about 11 w/w %), followed by pressure nozzle type spray drying under hot air at 200° C. to give powders (Sample Nos. 2 to 4).

According to the same manner as that described for methyl cellulose, powders were obtained after spray drying from a 2% aqueous solution of carboxymethyl cellulose (Daiseru K.K., lot No. 1150) and a 2% solution of xanthan gum (Keruko K.K., Eco-gum). Each amount of carboxymethyl cellulose and xanthan gum was indicated in Table 4 (Sample Nos. 5 to 7, and Nos. 8 to 10, respectively).

The core of each powder was mainly composed of β-1,3-glucan and the surface of the core was coated with the thickener.

The properties and the like of the solutions before spray drying (referred to as "spray dry raw solution" in Table 1) and the powders obtained were shown in Table 1. Conditions for preparation of the segregation reducing agent and properties of the powders

TABLE 1

| Sample No. | | Spray dry raw solution | | Properties of powders | | |
|---|---|---|---|---|---|---|
| | | Solid content (%) | Viscosity (cp) | Weight average diameter (μm) | Crude specific volume | Shape observed with microscope |
| 1 | Curdlan culture solution (β-1,3-glucan 40 mg/ml) CUD | 4.1 | 189 | 75 | 2.1 | nearly global |
| 2 | CUD:MC = 98:2(2%)** | 4.0 | 200 | 78 | 2.1 | nearly global |
| 3 | CUD:MC = 95:5(5%) | 3.9 | 218 | 82 | 2.6 | |
| 4 | CUD:MC = 90:10(11%) | 3.7 | 267 | 90 | 3.6 | |
| 5 | CUD:CMC = 98:2(2%) | 4.0 | 210 | 64 | 2.1 | nearly global |
| 6 | CUD:CMC = 95:5(5%) | 3.9 | 257 | 67 | 2.0 | |
| 7 | CUD:CMC = 90:10(11%) | 3.7 | 343 | 72 | 2.0 | |
| 8 | CUD:XG = 90:10(11%) | 3.8 | 268 | 85 | 2.4 | nearly global |
| 9 | CUD:XG = 80:20(25%) | 3.5 | 445 | 92 | 3.8 | |
| 10 | CUD:XG = 70:30(43%) | 3.2 | 670 | 100 | 3.8 | |

Note)
*measured by Brookfiled type viscometer (rotor 2 * 60 rpm).
**4 means by weight based on the β-1,3-glucan.
CUD: Curdlan, MC: methyl cellulose, CMC: carboxymethyl cellulose, XG: Xanthan gum
(These abbreviations are used in Tables hereinafter.)

EXAMPLE 2

The hydraulic composition having the following composition shown in Table 2 was produced according to a conventional method.

TABLE 2

| Maximum size of coarse aggregate (mm) | | 20 |
|---|---|---|
| Water-binding material* ratio (%) | | 34 |
| Sand aggregate ratio (%) | | 44 |
| Unit content (kg/m³) | Water W | 170 |
| | Cement C | 150 |
| | Blast-furnace slag B | 150 |
| | Fly ash F | 200 |
| | Fine aggregate S | 702 |
| | Coarse aggregate G | 891 |
| Admixture (% by weight based on binding material) | high performance water reducing agent | 7.5 (1.5%) |
| | AE water reducing agent | 0.75 (0.15%) |
| | segregation reducing agent | 1.5 (0.3%) |

*Binding material: Cement + blast-furnace slag + fly ash

As the high performance water reducing agent Sp, AE water reducing agent, segregation reducing agent, fine aggregate S, coarse aggregate G, cement C, blast-furnace slag B and fly ash F in Table 1, the following materials were used.

High performance water reducing agent Sp: Highly condensed formalin naphthalene sulfonate (Maity-150 (Trade Mark) of Kao K.K.).

AE water reducing agent: Lignin sulfonic acid compound polyol complex (Posolis No. 70 (Trade Mark) of Posolis Bussan K.K.).

Segregation reducing agent: That obtained by the method in Example 1 mainly composed of β-1,3-glucan to which each thickener was added.

Fine aggregate S:
S1: Produced in Takane, Hiroshima. (fineness modulus: 3.64, specific gravity: 2.51, water absorption: 2.51%, maximum size: 5 mm)
S2: Produced in Hiroshima, Kagawa. (fineness modulus: 1.94, specific gravity: 2.50 water absorption: 2.48%, maximum size: 1.2 mm) Used after adjusting the surface moisture ratios of the above S1 and S2 to not more than 1%, followed by mixing in a mixing ratio of 7:3.

Coarse aggregate G: Produced in Kasai, Hyogo. (fineness modulus: 6.65, specific gravity: 2.64, water absorption: 0.94%, maximum size: 20 mm) Used after adjusting the surface moisture ratio to 0% (surface dry condition).

Cement C: Conventional portland cement of Dainippon Cement K.K.

Blast-furnace slag B: Cerament (Trade Mark) of Daiichi Cement K.K.

Fly ash F: Fly ash of Dengen Kaihatsu K.K.

EXAMPLE 3

The hydraulic composition having the various segregation reducing agents obtained in Example 1 and the ingredients of concrete shown in Table 3 was produced according to a conventional method.

TABLE 3

| Sample No. | Segregation reducing agent | Unit content (kg/m³) | | | | | | Admixture | | Ready-mixed concrete properties | | | | Overall* evaluation |
|---|---|---|---|---|---|---|---|---|---|---|---|---|---|---|
| | | W | Binding material (p) | | | Aggregate | | Sp | Segregation reducing agent | Temp. (°C.) | Slump flow value (cm) | | Filling height (cm) | |
| | | | C | B | F | S | G | | | | Beginning | After 1 hr. | | |
| 1 | Culture sol. | 175 | 150 | 150 | 200 | 702 | 891 | 7.5 | 1.6 | 24 | 70 | — | 22 | — |
| 2 | Culture sol. + MC 2% | " | " | " | " | " | " | " | " | 24 | 70 | 68 | 30 | + |
| 3 | Culture sol. + MC 5% | " | " | " | " | " | " | " | " | 24 | 71 | 67 | 30 | ++ |
| 4 | Culture sol. + MC 11% | " | " | " | " | " | " | " | " | 25 | 67 | 62 | 32 | +++ |
| 5 | Culture sol. + CMC 2% | " | " | " | " | " | " | " | " | 24 | 70 | 64 | 30 | + |
| 6 | Culture sol. + CMC 5% | " | " | " | " | " | " | " | " | 24 | 71 | — | 24 | + |
| 7 | Culture sol. + CMC 11% | " | " | " | " | " | " | " | " | 24 | 70 | — | 32 | + |
| 8 | Culture sol. + XG 11% | " | " | " | " | " | " | " | " | 25 | 70 | 68 | 32 | ++ |
| 9 | Culture sol. + XG 25% | " | " | " | " | " | " | " | " | 25 | 67 | 65 | 35 | +++ |
| 10 | Culture sol. + MC 43% | " | " | " | " | " | " | " | " | 25 | 65 | 61 | 34 | +++ |

Note)*
+++: The slump flow value is at least 60 cm. The filling height is at least 30 cm. No aggregate segregation and no bleeding were observed.
++: The filling height is at least 30 cm regardless of the slump flow value. A little aggregate segregation and bleeding were observed.
+: The filling height is not more than 30 cm regardless of the slump flow value. Aggregate segregation and bleeding were observed.
—: The filling height is not more than 30 cm regardless of the slump flow value. Much aggregate segregation and bleeding were observed.

EXAMPLE 4

According to the method described in Example 1, segregation reducing agents were obtained as powders by adding methyl cellulose in an amount of 10% by weight based on curdlan or by adding xanthan gum in an amount of 20% by weight based on curdlan. By using these segregation reducing agents, the hydraulic composition, concrete, having varying unit water content in the composition and having ingredients of concrete shown in Table 4 was prepared.

TABLE 4

| Segregation reducing agent | Unit content (kg/m³) | | | | | | | Admixture | | Ready-mixed concrete properties | | | Overall* evaluation |
|---|---|---|---|---|---|---|---|---|---|---|---|---|---|
| | W | Binding material (p) | | | Aggregate | | Sp | Segregation reducing agent | Temp. (°C.) | Slump flow value (cm) | | Filling height (cm) | |
| | | C | B | F | S | G | | | | Beginning | | | |
| Culture soln. + MC 10% | 165 | 150 | 150 | 200 | 702 | 891 | 7.5 | 1.6 | 26 | 51 | | 30 | ++ |
| Culture soln. + MC 10% | 170 | " | " | " | " | " | " | " | 26 | 58 | | 31 | ++ |
| Culture soln. + MC 10% | 175 | " | " | " | " | " | " | " | 26 | 63 | | 33 | +++ |
| Culture soln. + MC 10% | 180 | " | " | " | " | " | " | " | 25 | 67 | | 34 | +++ |
| Culture soln. + | 165 | " | " | " | " | " | " | " | 26 | 62 | | 33 | +++ |

TABLE 4-continued

| Segregation reducing agent | Unit content (kg/m³) | | | | | | | Admixture | Ready-mixed concrete properties | | | |
|---|---|---|---|---|---|---|---|---|---|---|---|---|
| | | Binding material (p) | | | Aggregate | | | Segregation reducing agent | Temp. (°C.) | Slump flow value (cm) Beginning | Filling height (cm) | Overall* evaluation |
| | W | C | B | F | S | G | Sp | | | | | |
| XG 20% Culture soln. + XG 20% | 170 | " | " | " | " | " | " | " | 26 | 66 | 34 | +++ |
| Culture soln. + XG 20% | 175 | " | " | " | " | " | " | " | 25 | 67 | 35 | +++ |
| Culture soln. + XG 20% | 180 | " | " | " | " | " | " | " | 25 | 70 | 30 | ++ |

Note) *Evaluation as described in Table 3.

EXPERIMENTAL EXAMPLE 1

In the hydraulic composition, concrete, obtained in Example 3, concrete containing various segregation reducing agents was evaluated by determining slump flow values and filling heights in a U-shaped container (referred to as "Ready-mixed concrete properties" in Table 3). Further, segregation of the materials was evaluated by visual evaluation.

1) Measurement of slump flow values:
The measurement was carried out accoridng to "Test of in Water Non-segregation Concrete, Slump Flow Test" in "In Water Non-segregation Concrete Manual, Supplement I".

2) Measurement of filling heights in the U-shaped container:
A U-shaped container shown in the drawings was used. There was a concrete filling chamber A on one side of the container, while there was a measurement chamber B on the other side. There was a window placed in the lower part in between the two chambers. Steel bars (13 φ) were placed vertically at 35 mm intervals through the window and the chambers were closed off by a shutter until the beginning of the test.

For the test, the chamber A was filled with the concrete being tested and the shutter was raised. The height H to which the concrete rose in the measurement chamber B was measured as a basis for determining the filling ability.

The results of the evaluation are shown in Table 3.

When the powders obtained from the β-1,3-glucan culture, curdlan culture, was used, the concrete had excellent fluidity from the slump flow value of the ready-mixed concrete in Table 3, but the filling height in the U-shaped container was low and the aggregates were undoubtedly separated.

On the other hand, when a small amount of water-soluble thickener (i.e., at least 5 w/w % methyl cellulose based on curdlan; or at least about 10 w/w % xanthan gum based on curdlan) was added to the culture, there was obtained concrete with high fluidity and high filling ability without aggregate segregation and bleeding.

The addition of carboxymethyl cellulose provided better results than the culture solution, but did not give as effective improving effects as those of methyl cellulose or xanthan gum. This would be because the carboxymethyl cellulose reacted with calcium ions in the concrete and was converted into insoluble materials.

EXPERIMENTAL EXAMPLE 2

Table 3 also shows slump flow values of the concrete (sample Nos. 2 to 5 and 8 to 10) obtained in Example 3 having excellent resistance to segregation, high fluidity and high filling ability immediately after (referred to as "Beginning" in Table 3) and one hour after preparation of the concrete.

As is clear from Table 3, slump flow changes of the ready-mixed concrete with the passage of time were 2 cm to 5 cm, and concrete with excellent workability on the surface to be worked was obtained.

EXPERIMENTAL EXAMPLE 3

The concrete obtained in Example 4 was evaluated according to the method of Experimental example 1. The results are shown in Table 4.

As is clear from Table 4, when the unit water content is in the range of 165 to 180 kg/m³, the concrete had high fluidity and high filling ability and excellent resistance to aggregate segregation.

EXPERIMENTAL EXAMPLE 4

The concrete obtained was evaluated using the same experimental system as that in Example 3 except that this experiment was carried out adjusting temperatures of cement, aggregate and water to those of summer (28° C.) and winter (11° C.). The segregation reducing agents were powders obtained by adding methyl cellulose in an amount of 10% by weight based on curdlan.

The results are shown in Table 5.

TABLE 5

| Segregation reducing agent | Unit content (kg/m³) | | | | | | | Admixture | Ready-mixed concrete properties | | | |
|---|---|---|---|---|---|---|---|---|---|---|---|---|
| | | Binding material (p) | | | Aggregate | | | Segregation reducing agent | Temp. (°C.) | Slump flow value (cm) Beginning | Filling height (cm) | Overall* evaluation |
| | W | C | B | F | S | G | Sp | | | | | |
| Culture soln. + MC 10% | 175 | 150 | 150 | 200 | 702 | 891 | 7.5 | 1.6 | 11 | 63 | 32 | +++ |
| Culture soln. + MC 10% | " | " | " | " | " | " | " | " | 18 | 63 | 33 | +++ |
| Culture soln. + MC 10% | " | " | " | " | " | " | " | " | 24 | 63 | 33 | +++ |

TABLE 5-continued

| Segregation reducing agent | Unit content (kg/m³) | | | | | | | Admixture Segregation reducing agent | Ready-mixed concrete properties | | | Overall* evaluation |
|---|---|---|---|---|---|---|---|---|---|---|---|---|
| | W | Binding material (p) C | B | Aggregate F | S | G | Sp | | Temp. (°C.) | Slump flow value (cm) Beginning | Filling height (cm) | |
| Culture soln. + MC 10% | " | " | " | " | " | " | " | " | 28 | 61 | 30 | ++ |

Note) *Evaluation as described in Table 3.

As is clear from Table 5, when the concrete temperature at the end of the mixing is in the range of 11° C. to 28° C., the concrete had high fluidity and high filling ability and excellent resistance to aggregate segregation.

What is claimed is:

1. A segregation reducing agent for a hydraulic composition which is obtained by adding a water-soluble thickener to a culture of a microorganism capable of producing a β-1,3-glucan selected from the group consisting of curdlan, paramylon and pachyman, in a sufficient amount to give a viscosity to the culture of from about 200 to 2000 cp, followed by spray drying so as to form a powder having a core of the β-1,3-glucan and a coating of the water-soluble thickener.

2. A segregation reducing agent according to claim 1, wherein the β-1,3-glucan is curdlan.

3. A segregation reducing agent according to claim 1, wherein the water-soluble thickener is a water-soluble cellulose.

4. A segregation reducing agent according to claim 3, wherein the water-soluble thickener is methyl cellulose.

5. A segregation reducing agent according to claim 1, wherein the water-soluble thickener is a xanthan gum.

6. A segregation reducing agent according to claim 1, wherein the water-soluble thickener is polyethylene glycol.

7. A segregation reducing agent according to claim 1, wherein the water-soluble thickener is added to the culture in a sufficient amount to give a viscosity to the culture of from about 200 to about 1000 cp.

8. A segregation reducing agent according to claim 1, having a weight average particle diameter of not more than about 100 μm.

9. A segregation reducing agent according to claim 1, wherein the amount of water-soluble thickener is present in an amount of from about 2 to 45% by weight based on the β-1,3-glucan.

10. A hydraulic composition comprising a segregation reducing agent wherein said segregation reducing agent is obtained by adding a water-soluble thickener to a culture of a microorganism capable of producing a β-1,3-glucan selected from the group consisting of curdlan, paramylon and pachyman, in a sufficient amount to give a viscosity to the culture of from about 200 to 2000 cp, followed by spray drying so as to form a powder having a core of the β-1,3-glucan and a coating of the water-soluble thickener and wherein the amount of the segregation reducing agent is from about 0.5 Kg to about 5 Kg per m³ of the hydraulic composition.

11. A hydraulic composition according to claim 10, wherein the hydraulic composition is concrete.

* * * * *